United States Patent [19]

Naito

[11] 4,334,655
[45] Jun. 15, 1982

[54] AUTOMATIC TAPE FEEDING DIRECTION REVERSING DEVICE IN A TAPE RECORDER

[75] Inventor: Kyohei Naito, Tokyo, Japan

[73] Assignee: Shinwa Kabushiki Kaisha, Tokyo, Japan

[21] Appl. No.: 135,916

[22] Filed: Mar. 31, 1980

[30] Foreign Application Priority Data

Apr. 3, 1979 [JP] Japan ................................. 54/40187

[51] Int. Cl.³ ...................... B65H 59/38; G03B 1/02; G11B 15/13
[52] U.S. Cl. .............................................. 242/191
[58] Field of Search ................ 242/186, 191, 200–204; 360/71, 74, 74.1, 74.2, 90, 93, 105–109

[56] References Cited

U.S. PATENT DOCUMENTS 4,190,215  2/1980  Hochbaum et al. ................ 242/186
4,238,808  12/1980  Tomita ................................ 360/74.2

*Primary Examiner*—Leonard D. Christian
*Attorney, Agent, or Firm*—James E. Nilles

[57] ABSTRACT

An automatic tape feeding direction reversing device in a tape recorder comprising a reel support rotated by a tape winding power source, an actuator which is oscillated about a movable shaft and which, when the reel support stops rotating, is moved together with the movable shaft, a reversing lever which is turned by the displacement of the movable shaft, and a reversing mechanism actuated by the reversing lever to reverse the tape winding direction.

4 Claims, 4 Drawing Figures

AUTOMATIC TAPE FEEDING DIRECTION REVERSING DEVICE IN A TAPE RECORDER

BACKGROUND OF THE INVENTION

1. Field of the Invention

This invention relates to an automatic tape feeding direction reversing device in a tape recorder.

2. Description of the Prior Art

The conventional tape feeding direction reversing device consists of a detection mechanism for detecting the completion of the tape winding, and a reversing mechanism which, on the basis of the output from the detection mechanism, actuates the pinch rollers and tape winding gears to reverse the direction of tape feeding. In the conventional device, the detection mechanism and the reversing mechanism are driven by different power sources. This gives rise to the problems that the construction, especially that of the link mechanism interconnecting the detection mechanism and the reversing mechanism becomes complicated, that an overall cost increases, and that these two mechanisms do not synchronize with each other.

SUMMARY OF THE INVENTION

The object of this invention is to provide an automatic tape feeding direction reversing device in a tape recorder which can overcome the drawbacks of the conventional devices. The device of this invention is characterized in that the completion of the tape winding is detected by the engagement of the detection disk mounted on and pressed against the reel support and the actuator oscillated by the tape winding power source; and that the reversing mechanism is actuated by the same power source to reverse the tape feeding direction. These characteristics of this device enables simpler construction and reliable tape reversing action.

To achieve the above objective and features, the device of this invention comprises: a reel support rotated by a tape winding power source; a detection disk mounted on the reel support, the detection disk being adapted to rotate with the reel support when the tape is being fed and to stop rotating together with the reel support when the tape winding is completed; an actuator which is oscillated about a movable shaft by the same power source and which, when the disk stops rotating, is brought into engagement with the detection disk and then moved together with the movable shaft about the engaging point between the disk and the actuator; a reversing lever connected through the movable shaft to the actuator and which is turned as the movable shaft is displaced; and a reversing mechanism connected with and actuated by the reversing lever to reverse the tape winding direction.

The process of reversing the tape feeding direction by the device of this invention may be summarized as follows: while the tape is being fed, the detection disk is rotated without preventing the oscillatory movement of the actuator; when the tape winding is completed, the reel support and the detection disk stop rotating and the detection disk is brought into engagement with the actuator; by the driving force of the tape winding power source, the actuator then moves together with the movable shaft about the engaging point between the detection disk and the actuator; and the displacement of the movable shaft causes the reversing lever to turn, actuating the reversing mechanism and automatically reversing the direction of tape feeding.

Since the completion of the tape winding is detected by the engagement of the detection disk and the actuator, and since the actuator and the detection disk are driven by the one and same power source, the device of this invention is simple in construction and reliable in the tape reversing action.

DETAILED DESCRIPTION OF THE PREFERRED EMBODIMENT

Figure 1:
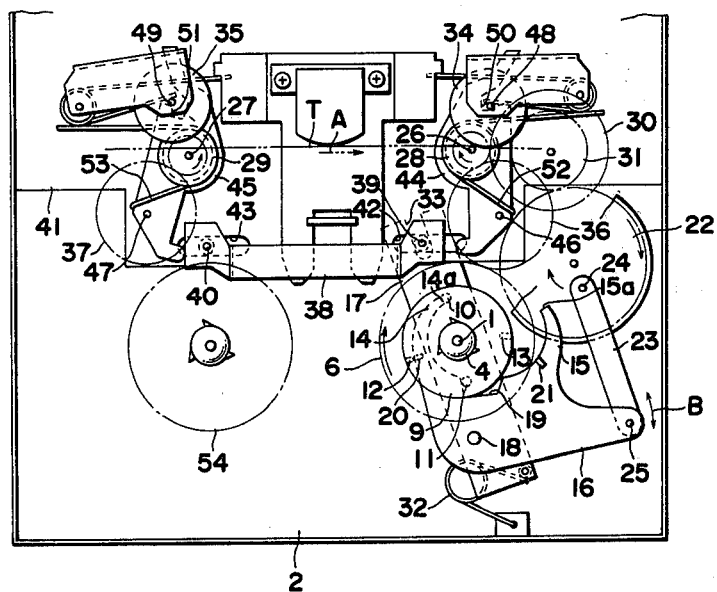
FIG. 1 is a partially cutaway plan view showing an embodiment of this invention.
Figure 2:
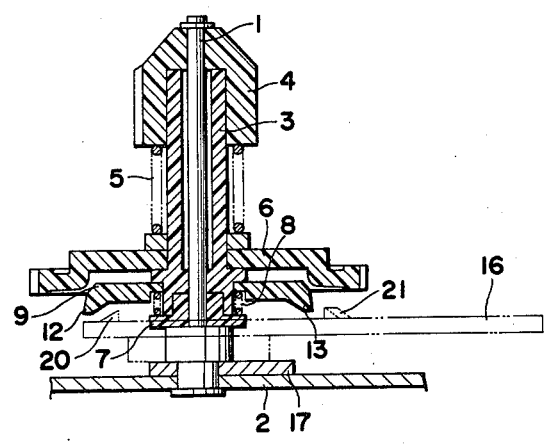
FIG. 2 is a cross-sectional view of a detection disk portion.

Reference numeral 1 represents one of a pair of reel shafts projecting upwardly from a chassis 2 and on which is rotatably mounted a reel support 3, on the top of which is fixed a reel mount 4 for engagement with a cassette reel. Interposed between the reel mount 4 and a reel support drive gear 6 is a spring 5 which presses the gear 6 against the reel support 3 so that the reel support rotates with the gear.

Under the reel support drive gear 6, a spring 8 is disposed between a detection disk 9 and a seat 7 secured to the lower end of the reel support so that the detection disk 9 is pressed with a small pressure against the reel support 3 so as to be rotatable with it. Protruding downwardly from the undersurface of the detection disk 9 are a pair of position setting projections 10, 11 and a pair of engagement projections 12, 13, said engagement projections 12, 13 having guide slopes 12a, 13a and vertical engagement surfaces 12b, 13b. Disposed under the detection disk 9 is an actuator 16 which is rotatably mounted on a movable shaft 18 projecting from a reversing lever 17 which will be described later. At one end the actuator 16 has a pair of arms 14, 15 curved toward each other and having push portions 14a, 15a on their front ends. Midway between the pair of arms 14, 15 the actuator 16 has a recess 19 for receiving one of the position setting projections 11 to restrict the rotation of the detection disk. The arms 14, 15 have a pair of upwardly protruding engagement projections 20, 21 on the upper surface thereof. The other end of the actuator 16 is connected through a connecting arm 23 and shafts 24, 25 to a drive gear 22 driven by the motor 22A (FIG. 3) whereby the actuator is reciprocally oscillated as shown by the arrow B in FIG. 3 as the drive gear 22 rotates.

Designated by 26, 27 are capstans with pinions 28, 29 secured at the lower portion thereof and which are driven by the motor 22A through a belt transmission mechanism. As the motor rotates, the capstan 26 on the right-hand side is driven to rotate clockwise and the other capstan 27, counterclockwise. The rotation of the capstan 26 on the right-hand side is transmitted reduced to the drive gear 22, which is in mesh with the gear 31 rigidly connected with the gear 30 which in turn meshes with the pinion 28 on the right-hand side capstan 26.

At one end where the movable shaft 18 is attached, the reversing lever 17 has a spring 32 which is connected at one end with the chassis 2 and at the other end with the reversing lever 17 so that the reversing lever 17 is rotatable about the reel shaft 1 by the snap action of the spring 32. The reversing lever 17 also has a notch 33 formed at the other end into which is fitted a shaft 39 which in turn is connected with one end of a sliding arm 38. The sliding arm 38 makes up a reversing mechanism which actuates pinch rollers 34, 35 and tape winding gears 36, 37.

A pair of shafts 39, 40 fitted at the ends of the sliding arm 38 are received in a pair of guide slots 42, 43 formed in a subchassis 41 so that the shafts can be slid along the slots. Since the shaft 39 is engaged with the reversing lever 17, it is slid along the slot as the lever 17 is turned.

A pair of reversing members 44, 45 making up the reversing mechanism are rotatable about the capstans 26, 27 on both sides of the sliding arm 38. At one end of the reversing members 44, 45, the tape winding gears 36, 37 in mesh with the pinions 28, 29 are rotatably supported on shafts 46, 47. Cam grooves 50, 51 are formed at the other end of the reversing members 44, 45 to receive shafts 48, 49 of the pinch rollers 34, 35. The sliding action of the sliding arm 38 and the turning action of the reversing members 44, 45 with the aid of springs 52, 53 cause the tape winding gears 36, 37 to engage with or disengage from the reel support drive gears 6, 54 and at the same time bring the pinch rollers 34, 35 into and out of pressing contact with the capstans 26, 27, thus reversing the tape winding direction.

We will explain the action of this embodiment in the following. Let us first consider the case where the sliding arm 38 is slid to the left-hand side position, as shown in FIG. 1, so that the tape winding gear 36 on the right-hand engages with the reel support drive gear 6, the pinch roller 34 is pressed against the capstan 26, and the tape T is fed from the left-hand side reel to the right-hand side reel in the direction of the arrow A of FIG. 1. In this condition, the reversing lever 17 assumes the position as indicated by the solid line in FIG. 3 and the actuator 16 is oscillated about the movable shaft 18 in the direction of the arrow B of FIG. 3 as the drive gear 22 is driven by the motor. One of the push portions 14a or the recess 19 of the actuator 16 pushes the position setting projection 10 or 11 of the detection disk 9 to rotate the detection disk 9 to a predetermined position. At the same time, the actuator 16 oscillates in such a manner that one of the engagement projections 20 of the actuator 16 crosses the locus of the rotating projection 12 of the detection disk 9 from the inner side of the projection 12 to the back and that the other engagement projection 21 of the actuator 16 reciprocates outside the locus of the rotating projection 13.

While the tape T is being wound upon the reel, the reel support 3 rotates clockwise and therefore the detection disk 9 which is mounted on the support reel and pressed by the spring against it is also rotated clockwise. Thus, even if the detection disk 9 is pushed and rotated by the recess 19 of the actuator 16 to the predetermined position, it is further rotated clockwise by the rotation of the reel support 3 and the engagement projection 12 on the detection disk 9 moves out of the line on which it can engage with the projection 20 of the actuator 16, so that the actuator 16 continues its alternating pivotal movement within a certain range without engaging with the projections 12, 13 of the detection disk 9.

When the tape T has been wound up, the reel and the reel support 3 stop rotating and at the same time the detection disk 9 mounted on the reel support 3 also stops rotating. Then, as the actuator 16 is pivoted in one direction, the position setting projections 10, 11 of the detection disk 9 are pushed by the one of the push portions 14a and one edge of the recess 19 of the actuator 16 until the detection plate 9 is moved to a predetermined position. Then, as the actuator 16 is pivoted in the opposite direction, the engagement projection 20 approaches the projection 12 of the detection disk 9 until it engages with and slides along the guide slope 12a of the projection 12. The engagement projection 20 pushes up the detection disk 9 as it slides under the guide slope 12a and moves past it. When the actuator 16 is pivoted in the first direction again, the projection 20 moves back as it came, and abuts against the vertical engagement surface 12b of the projection 12 on the detection disk 9. This prevents a further movement of the actuator 16 about the shaft 18 although the rotation of the drive gear 22 tends to turn the actuator in the same direction or clockwise. As a result, the rotating force of the drive gear 22 now acts on the reversing lever 17. That is, the actuator 16 moves clockwise about the engagement point between its projection 20 and the projection 12 of the detection disk 9 so that the shaft 18 also moves about that engagement point. This causes the reversing lever 17 to turn clockwise about the reel shaft 1 and, by the action of the spring 32, snap into the position indicated by the double-dot line in FIG. 3, with the result that the sliding arm 38 connected with the other end of the reversing lever 17 is slid toward the right-hand side as viewed in FIG. 1. This causes the reversing member 44 on the right-hand side to move against the force of the spring 52, disengaging the tape winding gear 36 and the pinch roller 34 from the reel support drive gear 6 and the capstan 26 respectively. At the same time, the movement of the sliding arm 38 toward the right allows the reversing member 45 on the left-hand side to return to the working position by the action of the spring 53, thus bringing the tape winding gear 37 into mesh with the reel support drive gear 54 and pressing the pinch roller 35 against the capstan 27. As a result, the tape feeding direction is reversed.

Figure 3:
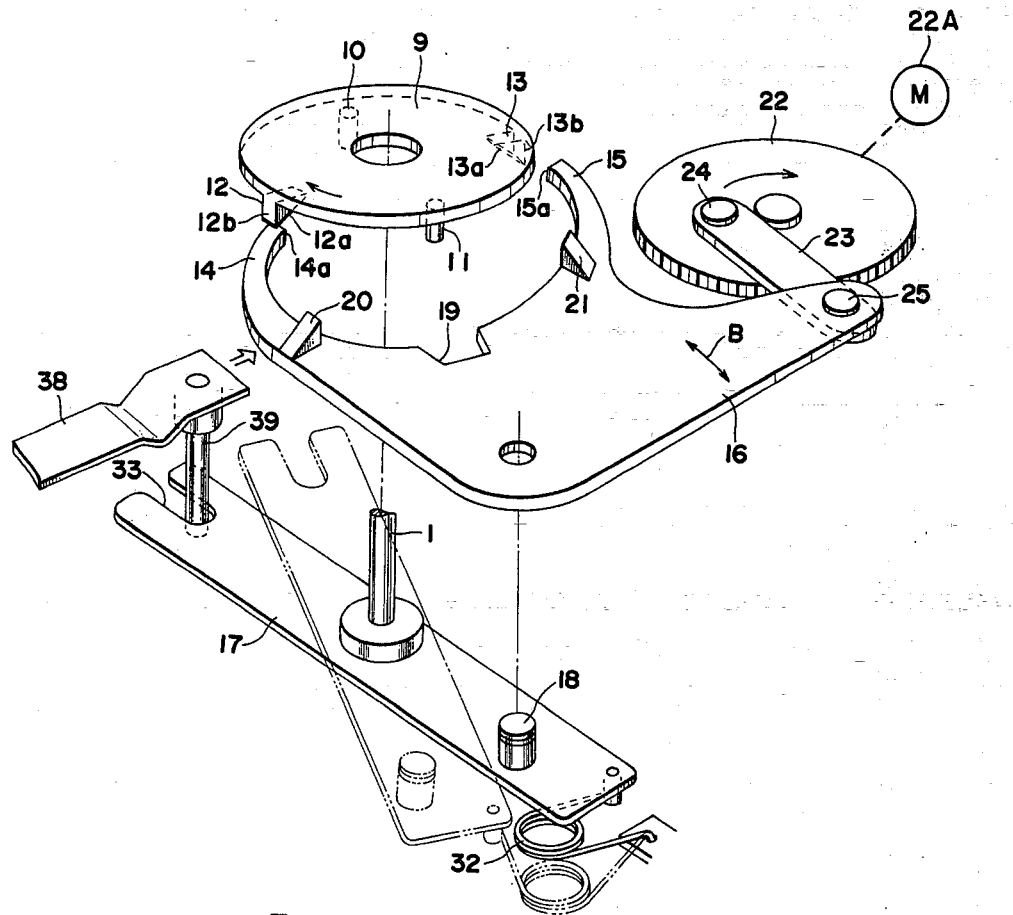
FIG. 3 is a perspective view of a disassembled actuator portion.
Figure 4:
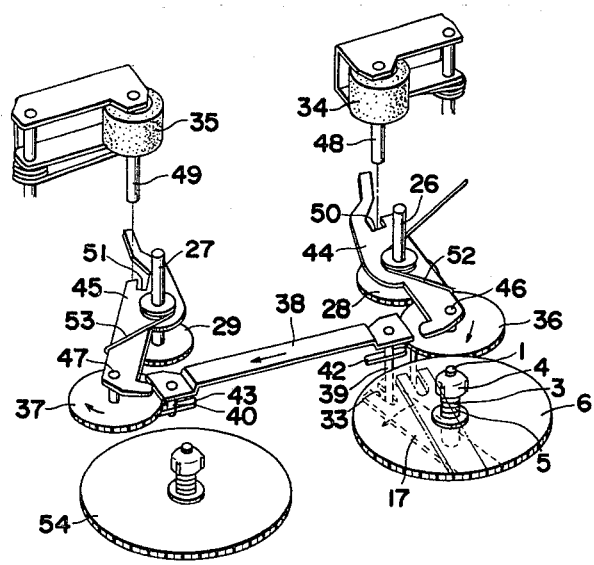
FIG. 4 is a perspective view of a disassembled reversing mechanism.

When the reversing lever 17 has been turned into the position as shown by the double-dot line in FIG. 3, the projection 20 of the actuator 16 becomes disengaged from the projection 12 of the detection disk 9 and the other projection 21 of the actuator 16 is set into the position where it can engage with the other projection 13 of the detection disk 9. The projection 21 and the push portion 15a of the actuator 16 and the projection 13 of the detection disk 9 are now situated in the same relationship among them as that which existed among the projection 20, the push portion 14a and the projection 12 before the reversing lever 17 has been actuated. The arm 15 now performs the same action as the arm 14 did when the reversing lever 17 was in the position shown by the solid line of FIG. 3; that is, when the tape winding has been completed, the reversing lever 17 is automatically turned into the other position.

While the tape is being rewound, the reel support 3 and the detection disk 9 are rotating counterclockwise, so that the actuator 16 is oscillating about the movable shaft 18 in a predetermined range without the projection 21 of the actuator 16 engaging with the projection 13 of the detection disk 9. When the tape rewinding has been completed, the reel support 3 and the detection disk 9 stop rotating. The projection 21 then engages with the projection 13, and the rotation of the drive gear 22 causes the actuator 16 to move counterclockwise about the engaging point between the projections 21 and 13, thereby displacing the movable shaft 18 to turn the reversing lever 17 about the shaft 1 into the position indicated by the solid line in FIG. 3. This causes the sliding arm 38 to move toward the left-hand side position, releasing the reversing member 44 on the right-hand side and actuating the other reversing member 45 on the left-hand side so that the tape winding gears 36, 37 and the pinch rollers 34, 35 are displaced simultaneously. As a result, the tape feeding direction is reversed.

The process of reversing the tape feeding direction is summarized as follows: when the tape has been wound up, the lever 17 is turned to the position as indicated by the double-dot line or the solid line of FIG. 3; this causes the sliding arm 38 to move in either direction, actuating the pinch rollers 34, 35 and the tape winding gears 36, 37 simultaneously; and thus automatically reverse the tape feeding direction.

What is claimed is:

1. An automatic tape feeding direction reversing device in a tape recording comprising: a tape winding power source; a reel support (3) rotated by said tape winding power source; a detection disk (9) mounted on said reel support, said detection disk being adapted to rotate with the reel support when the tape is being fed and to stop rotating together with the reel support when the tape winding is completed; a reversing lever (17); a movable shaft (18) on said reversing lever; an actuator (16) which is oscillated about said movable shaft by the said power source and which, when said disk stops rotating, is brought into engagement with said detection disk and then moved together with said movable shaft about the engaging point between said disk and said actuator; said reversing lever being connected through said movable shaft to said actuator and being turned by the displacement of said movable shaft; and a reversing mechanism (38, 44, 45) connected with and actuated by the reversing lever to reverse the tape winding direction.

2. A device as set forth in claim 1, wherein the detection disk (9) is coaxial with the reel support (3) and is pressed against it by a spring (8) so that the detection disk (9) can be displaced axially, said spring (8) being disposed between the detection disk (9) and a seat (7) mounted on the reel support (3).

3. A device as set forth in claim 1, further comprising: a pair of arms (14, 15) formed at one end of the actuator (16), said arms (14,15) being curved toward each other and having push portions (14a, 15a) at their front ends; a recess (19) cut in the actuator (16) midway between the pair of arms (14,15); and a pair of position setting projections (10,11) formed on the detection disk (9), said position setting projections (10,11) being adapted to engage with the push portions (14a, 15a) and the recess(19) of the actuator (16).

4. A device as set forth in claim 1, further comprising: a pair of engagement projections (12, 13) formed on the detection disk (9) and having a guide slope (12a, 13a) and a vertical engagement surface (12b, 13b); and a pair of engagement projections (20,21) formed on the actuator (16) and adapted to engage with the engagement projections (12, 13) on the detection disk (9).

* * * * *